J. H. ETHEREDGE.
INSECT TRAPPING ATTACHMENT FOR CULTIVATORS.
APPLICATION FILED JULY 6, 1915.

1,177,175.

Patented Mar. 28, 1916.
2 SHEETS—SHEET 1.

Inventor
J. H. ETHEREDGE

By Watson E. Coleman
Attorney

J. H. ETHEREDGE.
INSECT TRAPPING ATTACHMENT FOR CULTIVATORS.
APPLICATION FILED JULY 6, 1915.

1,177,175.

Patented Mar. 28, 1916.
2 SHEETS—SHEET 2.

Inventor
J. H. ETHEREDGE

By Watson E. Coleman
Attorney

UNITED STATES PATENT OFFICE.

JOHN H. ETHEREDGE, OF ROBSTOWN, TEXAS.

INSECT-TRAPPING ATTACHMENT FOR CULTIVATORS.

1,177,175.  Specification of Letters Patent. Patented Mar. 28, 1916.

Application filed July 6, 1915. Serial No. 38,279.

*To all whom it may concern:*

Be it known that I, JOHN H. ETHEREDGE, a citizen of the United States, residing at Robstown, in the county of Nueces and State of Texas, have invented certain new and useful Improvements in Insect-Trapping Attachments for Cultivators, of which the following is a specification, reference being had to the accompanying drawings.

My invention relates to cultivator attachments, and the primary object of the invention is the provision of an attachment adapted to be applied to any ordinary cultivator and so constructed as to trap insects feeding on the plants over which the cultivator is passing.

A further object of my invention is the provision of a trapping attachment of this character which is very simple in construction, which may be readily applied and removed from the cultivator, and which I have found very effective in action, this attachment comprising a plurality of pans adapted to hold oil or other insect trapping liquid, these pans being disposed in front of the cultivator plows or shovels so that as the cultivator passes along the row of plants the insects on the plants will be shaken off into these pans and caught.

A further object of my invention is the provision of means whereby the pans may be adjusted so that they may either be lifted slightly above the ground or may travel thereupon.

A further object in this connection is to provide means for supporting the pans and preventing wear upon the bottom of the pans, this means permitting the detachment of the pans therefrom, and another object is to provide means for preventing the foliage of the plant from dipping into the pans and becoming covered with oil.

A further object is to provide means for shaking the plants above the pans and in connection therewith to provide means for preventing the insects from being thrown over the pans when the plants are so shaken, this means being detachable when the device is used in connection with small plants, that is, for instance, where it is used for cotton which is only partially grown.

Other objects will appear in the course of the following description.

Figure 1:
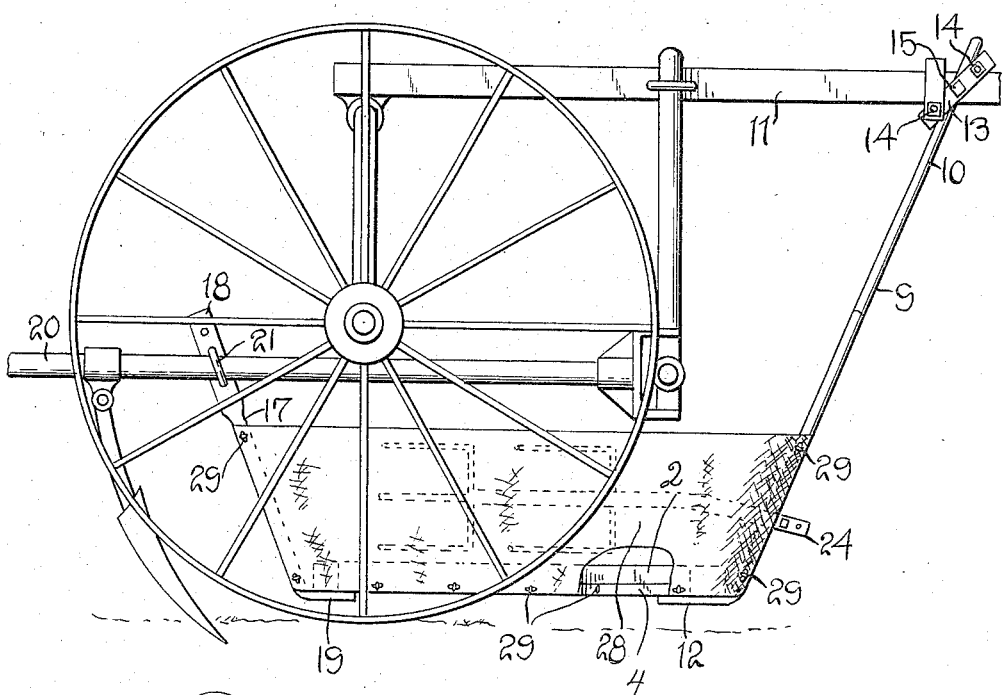
Figure 4:
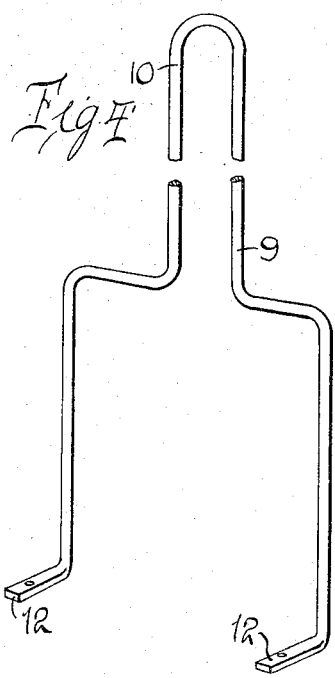
Figure 5:
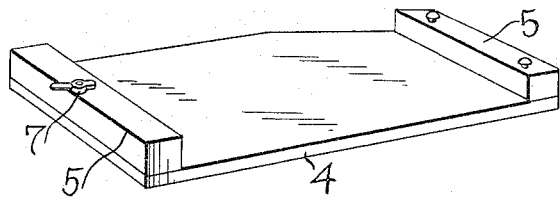
Figure 2:
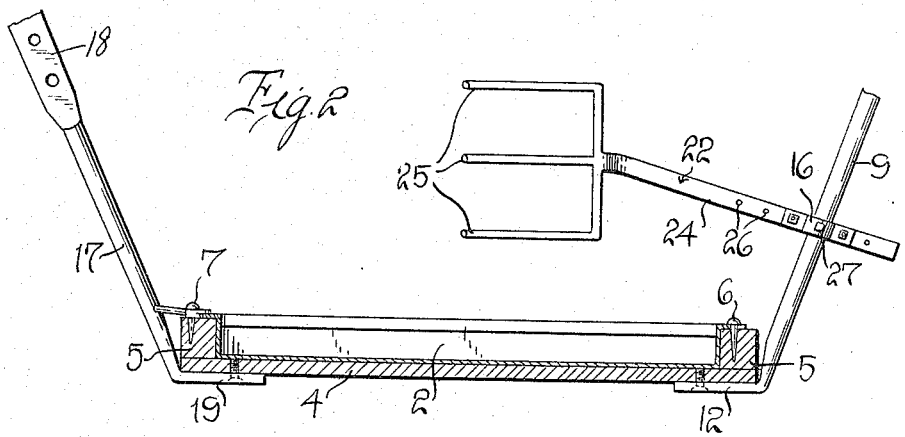
Figure 3:
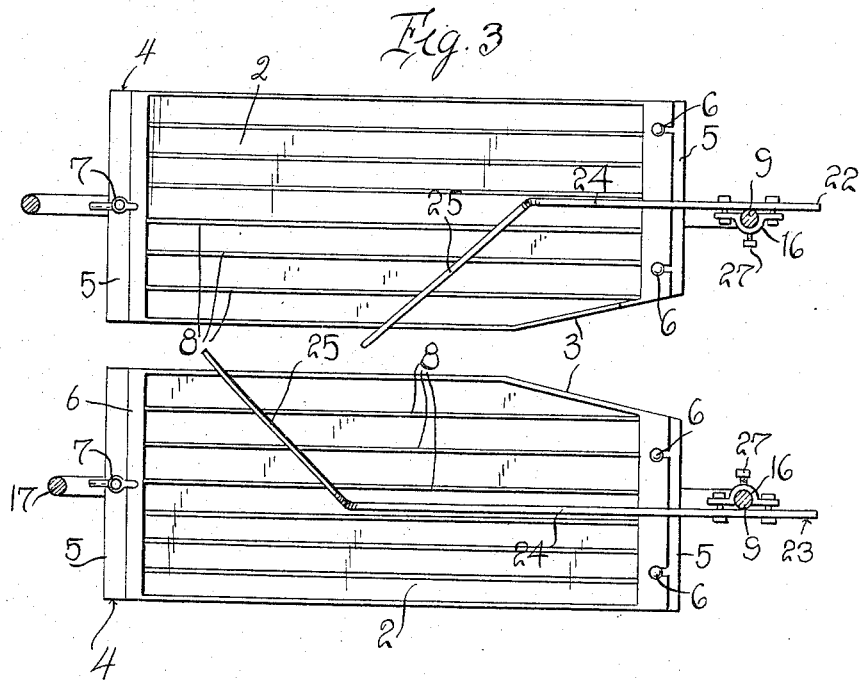

My invention is illustrated in the accompanying drawings, wherein:

Figure 1 is a side elevation of a cultivator with my insect trapping device applied thereto; Fig. 2 is a longitudinal section through one of the pans and its carrier, showing the supporting members and the shaker in elevation; Fig. 3 is a top plan view of the pans, the supporting members being shown in section; Fig. 4 is a perspective detailed view of the yoke; Fig. 5 is a perspective detailed view of one of the shoes or pan carriers.

Referring to these figures, it will be seen that my attachment comprises a pair of pans 2, placed side by side and in spaced relation, and preferably, as shown in Fig. 1, disposed in front of the cultivator shovels. These pans are about thirty inches in length and twelve inches wide, and the forward inside corner of each pan is cut away at an inclination, as at 3, to allow the pans to be readily guided on either side of a row of plants. The pans are about two inches deep and are preferably made of metal and are preferably supported each upon a carrier or shoe designated 4. This is preferably made of wood and has a length equal to that of the pan and a width equal thereto. At the ends this carrier or shoe is formed with upwardly extending flanges. The pans may be held upon these shoes or carrier in any suitable manner, but I have shown the pans as having end flanges one of which is provided with slots adapted to engage pins 6, and have shown the opposite flange 5 as being provided with buttons 7 or wing nuts which may be turned over the pans to hold them firmly in place. These pans are adapted to be filled with oil or other viscid liquid which will serve to entrap or hold insects which are dislodged from the plants and fall into the pans. Preferably each of the pans is provided with a series of longitudinally extending strips 8, these strips being spaced from each other a distance of one-half an inch and preventing the foliage from dipping into the oil but not preventing insects from dropping into the pans.

For the purpose of attaching the pans to the frame of the cultivator, I provide at the forward ends of the pans the yoke which is designated generally 9. This yoke has a U-shaped portion 10 which is adapted to embrace the tongue 11 of a cultivator. Below this U-shaped portion the legs of the yoke extend laterally and then extend downward and rearward and at their lower ends the legs are bent, as at 12, so as to be attached to the shoe 4. Preferably this yoke is made of iron piping or like material, and the yoke may be held to the tongue by any suitable means which will permit a proper adjustment of the yoke. For the purpose of holding the yoke to the tongue I have shown the oppositely disposed metallic plates or strips 13, these strips extending transversely of the yoke and being held to the tongue by means of the transversely extending bolts 14 extending above and below the tongue. The strips are provided with set screws 15 which engage the yoke. It will thus be seen that the angle of the yoke may be changed with relation to the cultivator tongue and that the yoke may be adjusted vertically thereon. Mounted upon the downwardly extending legs of the yoke are the vertically adjustable clamping collars 16 whose purpose will be later stated. The lower end 12 of each leg of the yoke is flattened, extends down beneath the shoe, and is attached thereto by screws or other suitable means.

The rear end of each shoe or carrier 4 is supported by means of the upwardly and rearwardly extending braces 17. Each of these braces is formed of iron pipe and the pipe is flattened at its upper end, as at 18, and provided with a plurality of perforations. The lower end of the pipe is angularly bent and flattened, as at 19, and inserted below and attached to the rear end of the corresponding shoe or carrier 4. The upper ends of the braces 17 are connected to the beams 20 of the cultivator by means of the U-bolts 21, or in any other suitable manner which will permit an adjustment of these braces. It will be seen that by adjusting the braces and the yoke 9 upward, the shoes and the pans with them may be lifted above the ground and that by properly adjusting these braces and the yoke the pans may be set at any desired inclination or held in a horizontal position and that they may be made to just touch and glide over the ground.

For the purpose of shaking and agitating the row of plants on each side of which the pans travel so as to thereby shake off the insects upon the plants, I provide the plant shakers 22 and 23. These shakers each consist of a shank 24 having at one end a many-tined head having relatively long resilient tines or fingers 25, these fingers being disposed in a plane at an inclination to the shank 24. The shank at its rear end is perforated with a plurality of openings, as at 26. These shanks are adapted to be engaged with the clamping collars 16 and adjusted longitudinally thereon while the clamping collars may be raised or lowered and held in their adjusted position by set screws 27 or in any other suitable manner. These shakers extend rearward from the legs of the yoke and slightly inward so as to engage the row of plants and shake the plants. Preferably the shakers are disposed in a partially overlapped relation and one behind the other.

Where the machine is working on relatively tall plants, as for instance, tall cotton, the shaking of the plants by means of the shakers 22 and 23 would be liable to throw the insects off beyond the pans. In order to prevent this, I provide the walls 28 of canvas or other flexible material. These walls extend from the leg of the yoke rearward to the brace 18 and are disposed one on the outside of each pan. Preferably the braces and legs of the yoke are provided with buttons 29 or like devices whereby the canvas may be attached. Buttons 29 are also provided upon the outer edges of the shoes for the attachment of the lower edges of the canvas shields.

The operation of my invention will be obvious from what has gone before. As the machine travels along the row of plants the plants are shaken. The boll weevils and other insects are shaken off and drop into the pans. They are trapped in these pans by the viscid liquid contained therein. By reason of this adjustment the pans may be used in connection with a large variety of cultivators and for different kinds of work.

I have shown the pans as mounted upon a standard cultivator, but I, of course, do not wish to be limited to their use with any particular type of cultivator.

I have found these devices particularly effective in practice and have found that they do not interfere in the slightest degree with the use of the cultivator as a cultivator. Thus the trapping of the insects on the plants and the cultivation of the plants can be accomplished all at one time.

While I have illustrated certain details of construction and have found that these details are particularly effective in practice, yet I wish it understood that the attachment may be modified in many ways without departing from the spirit of the invention.

Having thus described my invention, what I claim is:

1. An insect trapping attachment for cultivators including a carrier having upstanding flanges at its ends, a pan resting on the carrier between the flanges of the carrier, said pan having flanges overlying the flanges of the carrier, coacting means carried by the flanges of the carrier and the flanges of the pan for detachably holding said pan to the carrier, and supporting means carried by the carrier adapted to be engaged with the cultivator.

2. An insect trapping attachment for cultivators including a carrier having upstanding flanges at its ends, a pan resting on the carrier between the flanges of the carrier, said pan having flanges overlying the flanges of the carrier, coacting means carried by the flanges of the carrier and the flanges of the pan for detachably holding said pan to the carrier, supporting means carried by the carrier adapted to be engaged with the cultivator, and shields detachably engaged with the supporting means of the carrier and with the carrier and extending above the carrier.

3. An insect trapping attachment for cultivators including a carrier having upstanding flanges at its ends, a pan resting on the carrier between the flanges of the carrier, said pan having flanges overlying the flanges of the carrier, coacting means carried by the flanges of the carrier and the flanges of the pan for detachably holding said pan to the carrier, supporting means carried by the carrier adapted to be engaged with the cultivator, and parallel members extending longitudinally of the carrier and secured to the upper marginal portions of the flanges of the carrier.

In testimony whereof I hereunto affix my signature in the presence of two witnesses.

JOHN H. ETHEREDGE.

Witnesses:
HENRY E. GOUGER,
C. E. EASON.

Copies of this patent may be obtained for five cents each, by addressing the "Commissioner of Patents, Washington, D. C."